UNITED STATES PATENT OFFICE.

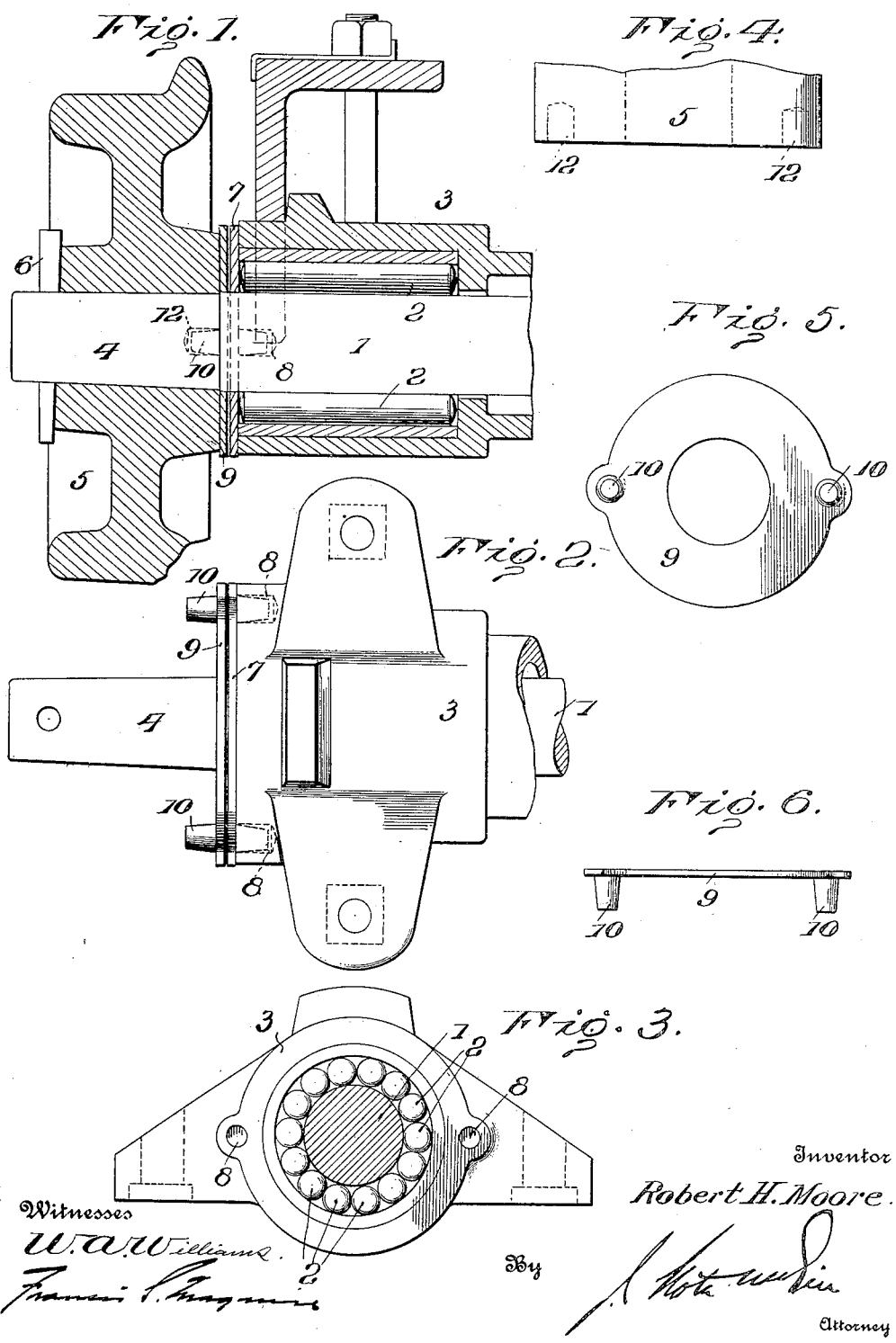

ROBERT H. MOORE, OF LOUISVILLE, KENTUCKY, ASSIGNOR TO AMERICAN CREOSOTING COMPANY, OF LOUISVILLE, KENTUCKY, A CORPORATION OF KENTUCKY.

RUNNING-GEAR FOR WHEELED VEHICLES.

1,126,251.          Specification of Letters Patent.          Patented Jan. 26, 1915.

Application filed May 2, 1914. Serial No. 835,828.

*To all whom it may concern:*

Be it known that I, ROBERT H. MOORE, of Louisville, in the county of Jefferson and State of Kentucky, have invented certain new and useful Improvements in Running-Gear for Wheeled Vehicles; and I do hereby declare the following to be a full, clear, and exact description of the invention, such as will enable others skilled in the art to which it appertains to make and use the same.

In the type of running-gear for wheeled vehicles, such as tram cars, wherein the axles revolve in fixed bearings, difficulty has been experienced because of the wear between the wheel-hub and the bearing.

The object of the present invention is to overcome this difficulty, and to this end I provide means for preventing wear on the opposite faces of the bearing and wheel-hub, and which means may readily be replaced when necessary.

In the accompanying drawings, Figure 1 is a vertical sectional view of a portion of a wheel-axle, its bearing and wheel, showing my present improvement. Fig. 2 is a plan view of the bearing with the wheel removed. Fig. 3 is an end view of the bearing. Fig. 4 is a fragmentary view of the wheel-hub. Fig. 5 is a face view of one of the plates. Fig. 6 is an edge view thereof.

Referring to the drawings, 1 designates the axle which is shown as surrounded by roller-bearings 2 in a fixed housing 3. The end 4 of the axle projecting beyond the bearing is tapered to fit a corresponding taper in wheel 5, which latter, according to the means shown, is locked to the axle by a pin 6.

To the outer face of the bearing-housing is secured a plate 7 which is preferably drop-forged, said plate having lugs projecting therefrom which are designed to fit in sockets 8 formed in the bearing as shown in dotted lines Figs. 1 and 2 and in full lines in Fig. 3. To the face of the inner end of the wheel-hub is secured a similar plate 9, which is likewise preferably drop-forged, and said plate is also provided with lugs 10 (see Figs. 5 and 6) which fit in sockets 12 in the wheel-hub, shown in dotted lines Figs. 1 and 4. Both of these plates 7 and 9 are of corresponding diameters and preferably of greater diameter than the face of the wheel-hub. They are formed with corresponding central openings for fitting over the axle between the bearing and the tapered portion of the axle. By means of these two plates all wear is taken up between the end of the wheel-hub and bearing. In practice, the plate 9 revolves with the wheel, but the plate 7 remains stationary, being fixedly held to the bearing. All wear is taken up on the co-acting surfaces of these two plates. When necessary they may readily be replaced by simply temporarily removing the wheel.

I claim as my invention:

1. A running-gear for wheeled vehicles comprising a revoluble axle, a fixed bearing therefor, a wheel fast on such axle, and two metallic plates, set face to face, between the wheel-hub and said bearing, one plate being fixed to said bearing and the other fixed to the wheel-hub.

2. A running-gear for wheeled vehicles comprising a revoluble axle, a fixed bearing therefor having sockets extending inwardly from its outer face, a wheel fast on such axle, and two metallic plates, set face to face, between the wheel-hub and said bearing, said wheel having sockets extending outwardly from its inner face, and said plates having lugs projecting therefrom for fitting in said sockets.

In testimony whereof, I have signed this specification in the presence of two subscribing witnesses.

ROBT. H. MOORE.

Witnesses:
G. O. BOOMER,
JOHN L. HUNLOW.

Copies of this patent may be obtained for five cents each, by addressing the "Commissioner of Patents, Washington, D. C."